United States Patent

Shefelbine et al.

(10) Patent No.: US 8,969,469 B2
(45) Date of Patent: Mar. 3, 2015

(54) METHOD OF COAGULATING AN AMORPHOUS FLUOROPOLYMER LATEX

(75) Inventors: Terri A. Shefelbine, St. Paul, MN (US); Eric W. Adair, Hugo, MN (US); Werner M. Grootaert, Oakdale, MN (US); Naiyong Jing, Woodbury, MN (US); Brant U. Kolb, Afton, MN (US)

(73) Assignee: 3m Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/879,820

(22) PCT Filed: Nov. 10, 2011

(86) PCT No.: PCT/US2011/060170
§ 371 (c)(1),
(2), (4) Date: Apr. 17, 2013

(87) PCT Pub. No.: WO2012/067936
PCT Pub. Date: May 24, 2012

(65) Prior Publication Data
US 2013/0289188 A1 Oct. 31, 2013

Related U.S. Application Data

(60) Provisional application No. 61/415,018, filed on Nov. 18, 2010.

(51) Int. Cl.
*C08F 6/22* (2006.01)
*C08K 3/22* (2006.01)

(52) U.S. Cl.
USPC ............ 524/546; 524/413; 524/430; 524/432

(58) Field of Classification Search
USPC .................................. 524/546, 413, 430, 432
See application file for complete search history.

(56) References Cited

U.S. PATENT DOCUMENTS

| 4,035,565 A * | 7/1977 | Apotheker et al. ........... 526/249 |
|---|---|---|
| 4,038,244 A | 7/1977 | Ogden |
| 4,153,661 A | 5/1979 | Ree |
| 4,232,126 A | 11/1980 | Marquisee |
| 4,281,092 A | 7/1981 | Breazeale |
| 4,694,045 A * | 9/1987 | Moore .......................... 525/276 |
| 5,037,579 A | 8/1991 | Matchett |
| 6,218,000 B1 | 4/2001 | Rudolf |
| 6,289,590 B1 | 9/2001 | McDonald |
| 6,432,526 B1 | 8/2002 | Arney |
| 6,482,562 B2 | 11/2002 | Ezenyilimba |
| 6,790,915 B1 | 9/2004 | Higuchi |
| 6,803,402 B2 | 10/2004 | Higashino |
| 7,674,523 B2 | 3/2010 | Davidson |
| 7,691,936 B2 | 4/2010 | Malvasi |
| 2003/0228463 A1 | 12/2003 | Abusleme |
| 2005/0107544 A1 | 5/2005 | Wang |
| 2006/0141015 A1 | 6/2006 | Tessier |
| 2006/0148971 A1 | 7/2006 | Jing |
| 2006/0199898 A1 | 9/2006 | Funaki |
| 2006/0270804 A1 | 11/2006 | Xu |
| 2008/0081182 A1 | 4/2008 | Nam |
| 2008/0132623 A1 | 6/2008 | Jones |
| 2009/0253854 A1 | 10/2009 | Xu |
| 2010/0081747 A1 * | 4/2010 | Nam et al. .................... 524/410 |
| 2012/0092427 A1 * | 4/2012 | Ganapathiappan et al. .. 347/101 |

FOREIGN PATENT DOCUMENTS

| EP | 0732374 | 9/1996 |
|---|---|---|
| JP | 2008-115336 | 5/2008 |
| WO | WO 2009-085926 | 7/2009 |

OTHER PUBLICATIONS

Atiemo-Obeng, "Handbook of Industrial Mixing—Science and Practice", Wiley-Interscience, 2004, p. 370.
International Search Report for International PCT Application No. PCT/US2011/060170, mailed on May 22, 2012, 3 pages.

\* cited by examiner

*Primary Examiner* — Peter D. Mulcahy
*Assistant Examiner* — Henry Hu
(74) *Attorney, Agent, or Firm* — Julie Lapos-Kuchar

(57) ABSTRACT

Described herein is a method of coagulating a fluoropolymer latex comprising: providing an amorphous fluoropolymer latex; providing unmodified inorganic nanoparticles; contacting the amorphous fluoropolymer latex with a sufficient amount of unmodified inorganic nanoparticles to coagulate the amorphous fluoropolymer.

19 Claims, No Drawings

METHOD OF COAGULATING AN AMORPHOUS FLUOROPOLYMER LATEX

TECHNICAL FIELD

A process for coagulating an amorphous fluoropolymer latex in the presence of unmodified inorganic nanoparticles is described.

BACKGROUND

Fluoroelastomers, especially perfluorinated elastomers, are used in a wide variety of applications in which severe environments are encountered, specifically end uses where exposure to high temperatures and aggressive chemicals occur. For example, these polymers are often used as seals for aircraft engines, in semiconductor manufacturing equipment, in oil-well drilling devices, and in sealing elements for industrial equipment used at high temperatures.

Inorganic particles have been added to fluoropolymer compositions as fillers and/or to improve the final properties of the fluoropolymer article.

There are many papers which disclose adding inorganic particles and even inorganic nanoparticles as fillers to fluoropolymer dispersions prior to coagulation. One advantage is that a more uniform blend of the filler can be achieved. For example, Malvasi et al. (U.S. Pat. No. 7,691,936) discloses adding organic or inorganic fillers into a polytetrafluoroethylene or modified polytetrafluoroethylene dispersion and then coagulating. This process is said to produce good homogeneity and optimal distribution of the fillers in fluoropolymer fine powders. Malvasi et al. discloses coagulation occurring with the usual known methods of the prior art for the fluoropolymer dispersion, without the need of plant modification.

The traditional methods of coagulating fluoropolymer dispersions include: physical and chemical methods. In physical methods the dispersion may be subject to strong (high) shearing using a stirring device thereby coagulating the particles, (typically by rotor stator having shear rates in excess of 1000 (1/s)). Another method of physical coagulation is the freeze-thaw method. The dispersion is cooled sufficiently to freeze it, which destabilizes the dispersion so that on thawing, the coagulate separates from the liquid. Generally, this technique is not preferred for scale-up due to the scaleability and intensive energy requirements. In chemical coagulation, an electrolyte or inorganic salt is added to the dispersion so that the stability of the dispersion is decreased thereby causing coagulation.

Among these methods, it is preferable to use the chemical coagulation method wherein an electrolyte or inorganic salt is added to the polymer dispersion. Examples of electrolytes used to chemically coagulate fluoropolymer primary particles include HCl, $H_2SO_4$, $HNO_3$, $H_3PO_4$, $Na_2SO_4$, $MgCl_2$, $Al_2(SO_4)_3$, and ammonium carbonate. Among these compounds, it is preferable to use compounds which can volatize during the process of drying the coagulate. Examples of inorganic salts used to chemically coagulate fluoropolymer primary particles include alkali metal salts, alkaline earth metal salts, and ammonium salts, of nitric acid, hydrohalic acid, phosphoric acid, sulfuric acid, molybdate, monobasic or dibasic sodium phosphate, ammonium bromide, potassium chloride, calcium chloride, copper chloride and calcium nitrate. These electrolytes and inorganic salts may be used independently or in combinations of two or more.

SUMMARY

There is a desire to reduce process steps, cost, and/or metal ion content during the coagulation of an amorphous fluoropolymer latex. The process should not cause detrimental effects on the final polymer and may perhaps offer improved properties of the final polymer.

In one aspect, a method of coagulating a fluoropolymer latex is disclosed comprising: providing an amorphous fluoropolymer latex; providing unmodified inorganic nanoparticles; contacting the amorphous fluoropolymer latex with a sufficient amount of unmodified inorganic nanoparticles to coagulate the amorphous fluoropolymer latex.

In one embodiment, the method is substantially free of a traditional coagulating agent.

In another aspect, an amorphous fluoropolymer composite is disclosed, comprising: providing an amorphous fluoropolymer latex; providing unmodified inorganic nanoparticles; contacting the amorphous fluoropolymer latex with a sufficient amount of unmodified inorganic nanoparticles to coagulate the amorphous fluoropolymer latex.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more;

"and/or" is used to indicate one or both stated cases may occur, for example A and/or B includes, (A and B) and (A or B);

"latex" as used herein refers to a dispersion of polymer particles in an aqueous continuous phase; and "organic" has the common meaning in the art, for example, organic compounds are carbon-containing compounds with some exceptions/exclusions including: binary compounds such as carbides, carbon oxides, carbon disulfide; ternary compounds such as metallic cyanides, phosgene, carbonyl sulfide; and metallic carbonates, such as calcium carbonate.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure relates to the use of unmodified inorganic nanoparticles in the coagulation of an amorphous fluoropolymer latex. The coagulated fluoropolymer latex, herein referred to as a fluoropolymer composite, may then be subsequently cured to form fluoroelastomer articles.

By using unmodified inorganic nanoparticles to coagulate an amorphous fluoropolymer latex, the fluoropolymer composite of the present disclosure may be substantially free of traditional coagulating agents used for coagulation of a fluoropolymer lattices. Substantially free of traditional coagulating agents as used herein, means that less than 0.1, 0.05, 0.01, or even 0.001% by weight of a traditional coagulating agent is present relative to the amorphous fluoropolymer. Such traditional coagulating agents are mentioned in the Background and include, for example, a water soluble salt such as calcium chloride, magnesium chloride, aluminum chloride, aluminum nitrate or aluminum sulfate; or an acid such as nitric acid, hydrochloric acid, phosphoric acid, or sulfuric acid and combinations thereof. In some embodiments, these traditional coagulating agents are also used in conjunction with an organic liquid such as an alcohol or acetone. These traditional coagulating agents are used as solutions (e.g., water), typically containing 0.5% to 5% by weight. The ratio of the traditional coagulating agent solution to latex typically ranges from 1:5 to 5:1.

The coagulating agents used in the present disclosure are unmodified inorganic nanoparticles. As used herein, an "unmodified" inorganic nanoparticle means that the surface of the inorganic nanoparticle is not irreversibly associated (e.g., covalently-bonded) with an organic compound.

The unmodified inorganic nanoparticles of the present disclosure may comprise metal oxide nanoparticles. Such metal oxides include, for example, silicon dioxide (silica), zirconia, titania, ceria, alumina, iron oxide, zinc oxide, vanadia, antimony oxide, tin oxide, alumina/silica. Although the metal oxide may be essentially pure, it may contain small amounts of stabilizing ion such as ammonium and alkaline metal ions, or it may be a combination of metal oxides such as a combination of titania and zirconia.

The unmodified inorganic nanoparticles used in the present disclosure are preferably substantially spherical.

The unmodified inorganic nanoparticles have an average diameter of the primary particle of at least 25 nm, 20 nm, 15 nm, 10 nm, 5 nm or even 3 nm; at most about 100 nm, 50 nm, 30 nm, 20 nm, or even 10 nm depending on the inorganic nanoparticle used. The unmodified inorganic nanoparticles used in the present disclosure are typically un-aggregated. If the unmodified inorganic nanoparticles are an aggregation of primary particles, then the maximum cross-sectional dimension of the aggregated nanoparticle is within the range of range of about 3 nm to about 100 nm, about 3 nm to about 50 nm, about 3 nm to about 20 nm, or even about 3 nm to about 10 nm.

The unmodified inorganic nanoparticles as used herein may be distinguished from materials such as fumed silica, pyrogenic silica, precipitated silica, etc. Such silica materials are known to those of skill in the art as being comprised of primary particles that are essentially irreversibly bonded together in the form of aggregates, in the absence of high-shear mixing. These silica materials have an average size greater than 100 nm (e.g., typically of at least 200 nanometers) and from which it is not possible to straightforwardly extract individual primary particles.

The unmodified inorganic nanoparticles may be in the form of a colloidal dispersion. Examples of useful commercially available unmodified silica nanoparticles include commercial colloidal silica sols available from Nalco Chemical Co. (Naperville, Ill.) under the trade designation "NALCO COLLOIDAL SILICAS". For example, such silicas include NALCO products 1040, 1042, 1050, 1060, 2327 and 2329. Examples of useful metal oxide colloidal dispersions include colloidal zirconium oxide, suitable examples of which are described in U.S. Pat. No. 5,037,579 (Matchett), and colloidal titanium oxide, useful examples of which are described in U.S. Pat. No. 6,432,526 (Arney et al.).

In one embodiment, the surface of the unmodified inorganic nanoparticle is reversibly associated with an organic compound.

In one embodiment, the unmodified inorganic nanoparticles of the present disclosure be may associated with an organic compound via ionic bonding, hydrogen bonding, Van der waals forces, etc. For example, organic compounds with an acid end group, (e.g., a carboxylate salt, a carboxylic acid, a phosphoniate, a phosphonic acid, or a hydroxylamine) may ionically bond to the surface of the inorganic nanoparticle.

For example, metal oxide nanoparticles may be surface treated through adsorption of acidic or basic compounds onto the nanoparticle's surface. Metal oxide particles such as zirconia, alumina, or titania may be treated with an acidic compound, such as with carboxylic acids, phosphoric acids, and sulfonic acids or an acidic function derived from oxyacids of boron, carbon, phosphorus, and sulfur. Exemplary organic compounds that may be non-covalently bonded to the inorganic nanoparticles include: acetic acid or short chain organic molecules comprising an acidic end group such as polyalkyleneoxide, a polyol or a hydroxyl-substituted moiety having a carboxylate salt, carboxylic acid, phosphoniate, phosphonic acid, hydroxyamine end group.

Generally, the amount of unmodified inorganic nanoparticles needed to coagulate the amorphous fluoropolymer latex is at least 3000 ppm, 5000 ppm, 10,000 ppm, 50,000 ppm, 100,000 ppm, 200,000 ppm, 500,000 ppm, or even 1,000,000 ppm versus the amorphous fluoropolymer latex.

If the amount of inorganic nanoparticles added is too small, coagulation occurs gradually and incompletely. As a result, it may not be possible to recover all of the amorphous fluoropolymer from the latex. In some embodiments, it may not be desirable to add a substantial excess of unmodified inorganic nanoparticles, for reasons of cost and/or the unmodified inorganic nanoparticles may impact the properties of the resulting fluoroelastomer.

Generally, the unmodified inorganic nanoparticles are added to the amorphous fluoropolymer latex as a mixture, i.e., the unmodified inorganic nanoparticles are dispersed in a liquid, which is then added to the amorphous fluoropolymer latex. Having the unmodified inorganic nanoparticles dispersed in a liquid and the amorphous fluoropolymer dispersed as a latex aids in the blending of the nanoparticles and the amorphous fluoropolymer and is advantageous because there is less dust created during mixing than in the case of dry blending.

The amorphous fluoropolymer latex may be stirred during or after the addition of the unmodified inorganic nanoparticles. The stirring device is not limited to a specific type and includes for example a device having stirring means such as propeller blades, turbine blades, paddle blades, shell-shaped blades, in which the stirring speed can be controlled. In the present disclosure, the stirring device does not itself cause coagulation, i.e., the stirring device does not place high shear on the amorphous fluoropolymer latex. Instead, in the present disclosure, it is the addition of the unmodified inorganic nanoparticles, which destabilize the amorphous fluoropolymer latex causing coagulation and the stirring device provides a means for efficiently dispersing the unmodified inorganic nanoparticles in the fluoropolymer latex. In one embodiment, high shear is not used to coagulate the fluoropolymer latex. To determine if high shear is placed on the latex to cause coagulation, one can run an identical experiment without the unmodified inorganic nanoparticles to determine if the amorphous fluoropolymer latex coagulates.

In one embodiment, the average shear applied by the stirring device is less than 300 Hertz (Hz), 500 Hz, 750 Hz, 850 Hz, or even 950 Hz as defined for a stirred tank in Handbook of Industrial Mixing-Science and Practice by Paul, E. L., et al. eds., John Wiley & Sons, 2004, page 370.

During the process of coagulating amorphous fluoropolymer lattices with unmodified inorganic nanoparticles, it was discovered that some experiments worked while others did not. Since coagulation is based on the stability of surface charges of the dispersed latex particles, the zeta potential of the amorphous fluoropolymer lattices and the unmodified inorganic nanoparticles were measured. It was found, that in general, when the zeta potential between the amorphous fluoropolymer latex and the unmodified inorganic nanoparticles was opposite, the mixture would coagulate. It was also found that when the zeta potential on the amorphous fluoropolymer lattices and the unmodified inorganic nanoparticles was the same (i.e., both had a negative zeta potential), the latex may or may not coagulate. In this instance, there also appeared to be some correlation to the amount of unmodified inorganic nanoparticle used. Thus, equation I was derived to predict when the combination of amorphous fluoropolymer latex and unmodified inorganic nanoparticles would coagulate:

$$p \text{ value} = (\zeta_{latex} \cdot X_{latex}/100) - (\zeta_{np} \cdot Y_{np} \cdot X_{np}/100) \quad \text{Eq. 1}$$

where $\zeta_{latex}$ is the zeta potential of the amorphous fluoropolymer latex, $X_{latex}$ is the % of amorphous fluoropolymer latex solids, $\zeta_{np}$ is the zeta potential of the unmodified inorganic nanoparticles, $X_{np}$ is the percent of unmodified inorganic nanoparticles in a mixture, and $Y_{np}$ is the amount of the mixture of unmodified inorganic nanoparticles added.

It was concluded that when the p value was no more than 250, 300, 400, or even 450 g mV, then the combination of amorphous fluoropolymer latex and unmodified inorganic nanoparticles coagulated. The one exception is shown in comparative example 1 in the experimental section where, the p value was −441 and the combination of unmodified inorganic nanoparticles and amorphous fluoropolymer latex did not coagulate sufficiently.

Although not wanting to be limited by theory, it is believed that the unmodified inorganic nanoparticles destabilize the amorphous fluoropolymer latex by modifying the interfacial energy between the fluoropolymer particle suspended in water and the water.

In one embodiment, unmodified inorganic nanoparticles, which are acidic, attach to the surface of the amorphous fluoropolymer latex particles increasing the particle size of the latex and destabilizing the fluoropolymer latex particles to the point of coagulation. An unmodified inorganic nanoparticle mixture with a pH greater than 7 that forms a stable blend with an acidic amorphous fluoropolymer latex, can coagulate the amorphous fluoropolymer latex when the unmodified inorganic nanoparticles is acidified prior to contact with the amorphous fluoropolymer latex. The acidic unmodified inorganic nanoparticles can be subsequently ion exchanged to remove metal counter ions.

The amorphous fluoropolymer latex of the present disclosure may be a result of a suspension or an emulsion polymerization.

The amorphous fluoropolymer latex may be derived from non-fluorinated monomers, fluorinated monomers, or combinations thereof.

Non-fluorinated monomers include those known in the art and include for example, ethylene and propylene. Fluorinated monomers include those known in the art that are partially and fully fluorinated. Exemplary fluorinated monomers include: fluorinated olefins such as tetrafluoroethylene, chlorotrifluoroethylene, hexafluoropropylene, vinylidene fluoride, and vinyl fluoride; fluorinated ethers such as fluoroallyl ethers, fluoroalkyl vinyl ethers (such as perfluoromethyl vinyl ether, 3-methoxy perfluoropropylvinyl ether, and $CF_2CFOCF_2OCF_2CF_2CF_3$), and fluoroalkoxy vinyl ethers; fluorinated alkoxides such as hexafluoropropylene oxide; fluorinated styrenes, fluorinated siloxanes; and combinations thereof.

Exemplary amorphous fluoropolymer lattices of the present disclosure may include copolymers such as, a tetrafluoroethylene-hexafluoropropylene-vinylidene fluoride copolymer, a vinylidene fluoride-hexafluoropropylene copolymer, a tetrafluoroethylene-propylene copolymer, a tetrafluoroethylene-perfluoro alkyl vinyl ether copolymer, and a vinylidene fluoride-chlorotrifluoroethylene copolymer.

Additionally, cure-site monomers as are known in the art may be added during the polymerization, so that the amorphous fluoropolymer latex comprises iodine-, bromine- and/or nitrogen-containing cure site groups, which may be subsequently used to cross-link the amorphous fluoropolymer composite.

In one embodiment, iodine- and bromine-cure site groups may be derived from monomers of the formula: $CX_2=CX(Z)$, wherein: (i) X each is independently H or F; and (ii) Z is I, Br, $R_f$—U wherein U=I or Br and $R_f$=a perfluorinated or partially perfluorinated alkylene group optionally containing O atoms. In addition, non-fluorinated bromo- or iodo-olefins, e.g., vinyl iodide and allyl iodide, can be used. Exemplary iodine- and bromine-cure site groups may be derived from: $CH_2=CHI$, $CF_2=CHI$, $CF_2=CFI$, $CH_2=CHCH_2I$, $CF_2=CFCF_2I$, $CH_2=CHCF_2CF_2I$, $CH_2=CHCF_2CF_2CH_2CH_2I$, $CH_2=CH(CF_2)_4I$, $CH_2=CH(CF_2)_4CH_2CH_2I$, $CH_2=CH(CF_2)_6I$, $CH_2=CH(CF_2)_6CH_2CH_2I$, $CF_2=CFCH_2CH_2I$, $CF_2=CFCF_2CF_2I$, $CF_2=CFOCF_2CF_2I$, $CF_2=CFOCF_2CF_2CH_2CH_2I$, $CF_2=CFOCF_2CF_2CF_2I$, $CF_2=CFOCF_2CF_2CF_2CH_2CH_2I$, $CF_2=CFOCF_2CF_2CH_2I$, $CF_2=CFOCF_2CF_2CF_2I$, $CF_2=CFCF_2OCH_2CH_2I$, $CF_2=CFO(CF_2)_3$—$OCF_2CF_2I$, $CH_2=CHBr$, $CF_2=CHBr$, $CF_2=CFBr$, $CH_2=CHCH_2Br$, $CF_2=CFCF_2Br$, $CH_2=CHCF_2CF_2Br$, $CF_2=CFOCF_2CF_2Br$, $CF_2=CFCl$, $CF_2=CFCF_2Cl$, and mixtures thereof.

In one embodiment, the nitrogen-containing cure site group may comprise for example, a nitrile, an amidine, an imidate, an amidoxime, or an amidrazone group. Exemplary nitrogen-containing cure site group may be derived from: $CF_2=CF$—$CF_2$—O—$R_f$—CN, $CF_2=CFO(CF_2)_wCN$, $CF_2=CFO[CF_2CF(CF_3)O]_g(CF_2)_vOCF(CF_3)CN$, $CF_2=CF[OCF_2CF(CF_3)]_kO(CF_2)_uCN$, and mixtures thereof, wherein w represents an integer of 2 to 12; g represents an integer of 0 to 4; k represents 1 or 2; v represents an integer of 0 to 6; u represents an integer of 1 to 6, $R_f$ is a perfluoroalkylene or a bivalent perfluoroether group. Specific examples include perfluoro(8-cyano-5-methyl-3,6-dioxa-1-octene), $CF_2=CFO(CF_2)_5CN$, and $CF_2=CFO(CF_2)_3OCF(CF_3)CN$.

In one embodiment, non-fluoropolymer particles or semi-crystalline or crystalline fluoropolymer particles, or a combination thereof may be admixed with the amorphous fluoropolymer particles in the fluoropolymer latex. Exemplary non-fluoropolymers include: polyvinyl chloride and polyacrylate. Exemplary semi-crystalline or crystalline fluoropolymers include: polytetrafluoroethylene, tetrafluoroethylene-propylene (FEP) copolymer, tetrafluoroethylene-perfluoroalkoxyvinylether (PFA) copolymers, tetrafluoroethylene-hexafluoropropylene-vinylidene fluoride copolymers, ethylene-tetrafluoroethylene copolymers, polyvinylidene fluoride, propylene-chlorotrifluoroethylene copolymers, and ethylene-chlorotrifluoroethylene copolymers. In one embodiment, the fluoropolymer latex comprises less than 50%, 25%, 15%, 10%, 5%, 2%, 1%, 0.5%, 0.1%, or even 0.05% by weight of these non-fluoropolymers or semi-crystalline or crystalline fluoropolymers versus the total polymer solids in the fluoropolymer latex.

After coagulation of the fluoropolymer latex with the unmodified inorganic nanoparticles, the fluoropolymer composite comprising the coagulated amorphous fluoropolymer and unmodified inorganic nanoparticles is separated from the aqueous medium (e.g., by filtration) and may then be washed with water.

After collecting and washing, the fluoropolymer composite is dried at a temperature below the temperature at which thermal decomposition starts.

Because the fluoropolymer latex can be coagulated with unmodified inorganic nanoparticles instead of metal salts, the resulting fluoropolymer composite may comprise low amounts of metal ions. For example, in one embodiment, the fluoropolymer composite comprises less than 200, 100, or even 50 ppm of total metal ions. The total metal ion content may be reduced even further by the screening of the raw materials to ensure low metal ions.

After drying, the fluoropolymer composite can then be used to form articles. By the term "article" in connection with the present invention is meant a final article such as, for example, an O-ring as well as preforms from which a final shape is made, e.g. a tube from which a ring is cut. To form an article, the fluoropolymer composite can be extruded using a screw type extruder or a piston extruder. Alternatively, the fluoropolymer composite can be shaped into an article using injection molding, transfer molding or compression molding. Compression molding consists of placing a quantity of cold uncured fluoropolymer composite into a heated mold cavity and subsequently closing the mold using adequate pressure to shape the article. After retaining the amorphous fluoropolymer composite at sufficient temperature during sufficient time to allow vulcanization to proceed it can then be demolded. Injection molding is a shaping technique whereby the amorphous fluoropolymer composite is first heated and masticated in an extruder screw then collected in a heated chamber from which it is then injected into a hollow mold cavity by means of a hydraulic piston. After vulcanization the article can then be demolded. Transfer molding is similar to injection molding with the difference being that the amorphous fluoropolymer composite is not preheated and masticated by an extruder screw, but introduced as a cold mass in the heated injection chamber. In some embodiments, molding is carried out simultaneously with crosslinking. In some embodiments, molding is carried out before crosslinking.

Articles derived from the fluoropolymer composite presently disclosed are useful for in the semiconductor industry for the microchip manufacturing process where the fluoroelastomer may be used in seals of microchip fabrication equipment. In industries such as the semi-conductor, biotechnology, and pharmaceutical industries, there is a desire for cleaner fluoroelastomer parts (such as O-rings, quick connect seals, gaskets). In other words fluoroelastomer parts having extremely low metal ion content. In the present disclosure it has been found that unmodified inorganic nanoparticles may be used to coagulate the amorphous fluoropolymer latex resulting in a fluoroelastomer having low metal content and the ability to reduce a process step.

Some items/embodiments of the present disclosure include:

Item 1. A method of coagulating a fluoropolymer latex comprising:
 providing an amorphous fluoropolymer latex;
 providing unmodified inorganic nanoparticles;
 contacting the amorphous fluoropolymer latex with a sufficient amount of unmodified inorganic nanoparticles to coagulate the amorphous fluoropolymer latex.

Item 2. The method of item 1, wherein the method is substantially free of a traditional coagulating agent.

Item 3. The method of any one of items 1-2, wherein the amorphous fluoropolymer latex is perfluorinated.

Item 4. The method of any one of items 1-2, wherein the amorphous fluoropolymer latex is partially fluorinated.

Item 5. The method of any one of the previous items, wherein a p value is no more than 400 g mV.

Item 6. The method of any one of items 1-4, wherein the amorphous fluoropolymer latex and the unmodified inorganic nanoparticles are both acidic.

Item 7. The method of any one of the previous items, wherein the amorphous fluoropolymer latex is derived from a monomer selected from tetrafluoroethylene, hexafluoropropylene, perfluoromethyl vinyl ether, 3-methoxy perfluoropropylvinyl ether, $CF_2CFOCF_2OCF_2CF_2CF_3$, vinylidene fluoride, chlorotrifluoroethylene, ethylene, propylene, and combinations thereof.

Item 8. The method of any one of the previous items, wherein the amorphous fluoropolymer latex comprises an iodine- or a bromine-containing cure site group.

Item 9. The method of any one of the previous items, wherein the amorphous fluoropolymer latex comprises a nitrogen-containing cure site group.

Item 10. The method of item 9, wherein the nitrogen-containing cure site is a nitrile, an amidine, an imidate, an amidoxime, or an amidrazone.

Item 11. The method of any one of the previous items, wherein the unmodified inorganic nanoparticles have an average diameter of less than 100 nm.

Item 12. The method of any one of the previous items, wherein the unmodified inorganic nanoparticles comprise zirconium, alumina, zinc oxide, and combinations thereof.

Item 13. The method of any one of items 1-11, wherein the unmodified inorganic nanoparticles comprise silica.

Item 14. The method of any one of the previous items, wherein the amorphous fluoropolymer latex is a hexafluoropropylene-vinylidene fluoride copolymer and the unmodified inorganic nanoparticles are alumina.

Item 15. The method of any one of items 1-13, wherein the amorphous fluoropolymer latex is a tetrafluoroethylene-perfluoromethyl vinylether copolymer and the unmodified inorganic nanoparticles are zinc oxide.

Item 16. The method of any one of items 1-13, wherein the amorphous fluoropolymer latex is a tetrafluoroethylene-perfluoromethyl vinylether copolymer and the unmodified inorganic nanoparticles are zirconia.

Item 17. The method of any one of the previous items, wherein the fluoropolymer latex further comprises non-fluorinated polymer particles, semi-crystalline polymer particles, crystalline polymer particles, or a combination thereof.

Item 18. The method of item 17, wherein the fluoropolymer latex comprises less than 25% by weight of non-fluorinated polymer particles, semi-crystalline polymer particles, crystalline and polymer particles versus the total polymer solids in the fluoropolymer latex.

Item 19. The method of any one of the previous items, wherein at least 3000 ppm of the unmodified inorganic nanoparticles is added.

Item 20. A fluoropolymer composite made according to the method described in any one of items 1-19.

Item 21. The fluoropolymer composite of item 20, wherein the fluoropolymer composite comprises less than 200 ppm of total metal ions.

Item 22. A cured article derived from the fluoropolymer composite of any one of items 20-21.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

These abbreviations are used in the following examples: g=gram, hr=hour, min=minute, mol=mole, mL=milliliter, L=liter, MHz=megahertz, MPa=megapascals, psig=pounds per square inch gauge pressure. If not otherwise indicated chemicals are available from Sigma-Aldrich, St. Louis, Mo.

Materials

| Material Name | Description |
|---|---|
| Latex A | Latex of bromine cure site containing perfluoroelastomer prepared by aqueous emulsion polymerization having 66.2 mol % of tetrafluoroethylene, 33.7 mol % of perfluoromethyl vinylether and 0.36 wt % bromine (based on total wt of perfluoroelastomer) added as bromotrifluoroethylene. Solids content 34.38 wt %. |
| Latex B | Latex of nitrile cure site containing perfluoroelastomer prepared by aqueous emulsion polymerization having 66.8 mol % TFE, 32.0 mol % perfluoromethylvinyl ether (PMVE) and 1.2 mol % of a nitrile-containing cure site monomer, $CF_2$=$CFO(CF_2)_5CN$ (MV5CN). Solids content 30.3 wt %. |
| Latex C | Ultra-low viscosity peroxide curable copolymer of HFP and VDF. See "Latex C Preparation" |
| Zirconia sol #1 | Nanoparticle zirconia solution. See "Zirconia Sol #1 Preparation" |
| Zirconia sol #2 | Diafiltered zirconia sol. See "Zirconia Sol #2 Preparation" |
| Zirconia sol #3 | 14% solids colloidal solution of zirconia commercially available under the trade designation "NYACOL Zr50/14" from Nyacol Nano Technologies, Ashland, MA. |
| Alumina sol | 30% solids colloidal solution of $Al_2O_3$ commercially available under the trade designation "AERODISP W630" from Evonik Industries AG, Essen, Germany, |
| Zinc oxide sol | 30% solids colloidal solution of ZnO commercially available under the trade designation "NYACOL DP5370" from Nyacol Nano Technologies, Ashland, MA. |
| Silica sol #1 | 50% solids colloidal solution of $SiO_2$ commercially available commercially available under the trade designation "NALCO 1050" from Nalco Co., Naperville, IL |
| Silica sol #2 | 34% solids colloidal solution of $SiO_2$ commercially available under the trade designation "AERODISP 1836" from Evonik Industries AG, Essen, Germany. |
| Silica sol #3 | 15% solids colloidal solution of $SiO_2$ commercially available under the trade designation "NALCO 1115" from Nalco Co., Naperville, IL |
| Silica sol #4 | 15% solids colloidal solution of 5 nm $SiO_2$ commercially available under the trade designation "NALCO 2326" from Nalco Co., Naperville, IL |

Latex C Preparation

Latex C was prepared in an 80 L reactor to which were added 52 kg of water, 80 g of potassium phosphate buffer dissolved in an additional 500 g of water, and 40 g of ammonium persulfate dissolved in an additional 500 g of water. The headspace of the reactor was evacuated, the vacuum was broken and the reactor was pressurized with nitrogen to 25 psi (0.17 MPa). This vacuum and pressurization was repeated three times after which the reactor was heated to 176° F. (80° C. and pressurized to 74 psi (0.51 MPa) with a blend of hexafluoropropylene (HFP) and 1,4 diiodooctafluorobutane (available from SynQuest Lab, Alachua, Fla.). To prepare the blend of hexafluoropropylene (HFP) and 1,4 diiodooctafluorobutane, a 125 lb cylinder was evacuated and purged three times with nitrogen. After adding 1,4 diiodooctafluorobutane and HFE 7300 (commercially available from 3M Company, St. Paul, Minn.) in a blend ratio of 1:3, HFP was added based on the amount of 1,4 diiodooctafluorobutane added. Nitrogen was added to the cylinder to reach a pressure of 280 psig. The blend cylinder was then attached to the reactor and was fed using a blanket of nitrogen. The blend contained 97.2 wt % of HFP and 2.8 wt. % of 1,4, diiodooctafluorobutane. The reactor was then charged with vinylidene fluoride (VDF) and the above described blend of hexafluoropropylene (HFP) and 1,4 diiodooctafluorobutane to bring the reaction pressure to 220 psig. Total precharge of VDF and the blend of hexafluoropropylene (HFP) and 1,4 diiodooctafluorobutane were 755.63 g and 1570.42 g. The reactor was agitated at 450 rpm. As the reactor pressure dropped due to monomer consumption in the polymerization reaction, the blend of hexafluoropropylene (HFP) and 1,4 diiodooctafluorobutane and VDF were continuously fed to the reactor to maintain the pressure at 220 psig. The ratio of the blend and VDF was 0.67 by weight. After 7.45 hrs the monomer and blend feeds were discontinued and the reactor was cooled. The resulting dispersion had a solid content of 30.55 wt %.

Zirconia Sol #1 Preparation

The nanoparticle sol was prepared according to the method of Example 1 of WO Publ. No. 2009085926 (Kolb et al.) resulting in a Z average particle size of 15 nm (measured by photon correlation spectroscopy). The resulting sol was concentrated by evaporation to 45.8 wt % solids. This sol was further diluted before coagulation with deionized water to make a 15 wt % solids sol.

Zirconia Sol #2 Preparation

The reduced acid version of the zirconia sol #1 was prepared by placing the 45.8 wt. % solids sol prepared under "zirconia sol #1 preparation" in a bag of Spectra/Por molecular porous membrane tubing (Spectra/Por Dialysis membrane molecular weight cut off 12,000-14,000 g/mol, available from Spectrum Laboratories, Inc. Rancho Dominguez, Calif.) The bag containing the sol was then placed in an excess of deionized water and agitated with a magnetic stir bar. The resulting sol had a solids content of 30.5 wt. %.

Zeta Potential Test Method

The zeta potentials of the lattices and nanoparticle sols were measured using an AcoustoSizer II (Colloidal Dynamics, North Attelboro, Mass.) over the frequency range of 1 to 18 MHz. The instrument was calibrated with silica sol according to the instrument manufacturer's instructions prior to running the experiments. The constants used in the calculations for the zeta potential of each material are listed in Table 1. In all cases, the viscosity temperature=25° C., viscosity=0.8904 cp, Dviscosity/dT (%/C)=0, solvent density=0.9971 g/mL, speed of sound=1500 m/s and dielectric constant=78. The zeta potentials reported are the average of three tests run under the same conditions. The zeta potentials reported are calculated based on measuring the electrokinetic sonic amplitude effect. The reported zeta potentials are shown in Table 1 as well.

TABLE 1

| Material | Particle density (g/mL) | Concentration (wt %) | Dielectric Constant | Zeta potential mV |
|---|---|---|---|---|
| Latex A | 1.8 | 35.2 | 6 | −77.8 |
| Latex B | 1.8 | 30.5 | 6 | −89.8 |
| Latex C | 1.8 | 5.0* | 6 | −107.9 |
| Zirconia sol #2 | 5.6 | 30.5 | 12.5 | 42.8 |
| Zirconia sol #1 | 5.6 | 45.8 | 12.5 | 20.2 |
| Alumina sol | 4.0 | 30.0 | 10 | 51.6 |
| Zirconia sol #3 | 5.6 | 14.0 | 12.5 | 32.7 |
| Zinc oxide sol | 5.6 | 30.0 | 10.5 | −27 |
| Silica sol #1 | 2.2 | 50.0 | 4.5 | −52.3 |
| Silica sol #2 | 2.2 | 34.0 | 4.5 | −56.5 |

TABLE 1-continued

| Material | Particle density (g/mL) | Concentration (wt %) | Dielectric Constant | Zeta potential mV |
|---|---|---|---|---|
| Silica sol #3 | 2.2 | 15.0 | 4.5 | −55.5 |
| Silica sol #4 | 2.2 | 15.0 | 4.5 | −61.5 |

*The latex was diluted to 5.0 wt. % solids for zeta potential measurements to prevent coagulation in the equipment.

Example 1 (EX 1)

To 141.84 g of diluted (23.5 wt % solids) zirconia sol #2, 549.69 g of Latex B was dripped over 35 min while stirring at a medium speed with a Cowles blade driven by a Laboratory Disperserator series 2000 Model 90 (Premier Mill, Exton, Pa.). A thick foamy consistency developed that contained solids. After all latex was added the mixture was stirred for 28 min at a high speed. The mixture was allowed to settle for 27 min after which the liquid was filtered through cheese cloth and the solids were returned to a container. Approximately 500 mL of hot deionized water was added as the first rinse. The filtering and rinsing process was repeated two more times. Following the final rinse the solids were squeezed dry by hand and dried in a batch oven at 100° C. for 16 hr. This process yielded 172.3 g of material (86.15% yield).

Example 2 (EX 2)

To 594.18 g of Latex C, 60.6 g of alumina sol (30 wt % solids) was dripped over 2 min while stirring at medium speed (setting of 20 on VARIAC) with a Cowles blade driven by a Laboratory Disperserator series 2000 Model 90 (Premier Mill, Exton, Pa.). A crumb formed. The mixture was stirred for an additional 2 min and then allowed to settle for 5 min. The liquid was filtered through cheese cloth. The solids were washed three times as in Example 1 but with cold deionized water, then squeezed by hand and dried in a batch oven at 106° C. for 16 hrs.

Example 3 (EX 3)

To 602.30 g of Latex B, 60.6 g of alumina sol (30 wt. % solids) was dripped over approximately 5 min while stirring with a three blade IKA variable speed stirrer (IKA Works, Inc. Wilmington, N.C.) at 1600 RPM. A fine crumb resulted and was stirred for an additional 15 min then allowed to settle for 20 min. The solids were washed as in Example 1, but for 30 min in each wash. The solids were dried at 100° C. for 20 hrs yielding 100.1 g of material (50.0% yield).

Example 4 (EX 4)

To 594.2 g of Latex C, 62.50 g of zirconia sol #2 was added over the course of approximately 5 min while stirring with a Cowles blade at medium speed (setting of 20 on VARIAC) driven by a Laboratory Disperserator series 2000 Model 90 (Premier Mill, Exton, Pa.). Crumb formed and was stirred for an additional 1 min after addition of latex followed by 5 min of settling. The solids were washed and dried as in Example 2 yielding 173.6 g of material (86.4% yield).

Example 5 (EX 5)

To 594.18 g of Latex C, 129.9 g of zirconia sol #3 was added over the course of approximately 5 min while stirring at medium speed with a Cowles blade (setting of 20 on VARIAC) driven by a Laboratory Disperserator series 2000 Model 90 (Premier Mill, Exton, Pa.). Crumb formed and was stirred for an additional 1 min after addition of latex followed by 5 min of settling. The solids were washed and dried as in Example 2 yielding 181.2 g of material (90.6% yield).

Example 6 (EX 6)

To 87.0 g of zirconia sol #1, 288.0 g of Latex B latex was added over the course of 20 min while stirring with a magnetic stir bar on the highest setting on a magnetic stir plate (IKA). A thick foamy consistency persisted throughout the addition and contained solids. After adding the latex, the mixture was stirred an additional 30 min followed by 5 min of settling. The solids were washed as in Example 1. The solids were dried at 93° C. for 16 hrs and yielded 96.1 g of material (95.8%) yield.

Example 7 (EX 7)

To 6.60 g of zinc oxide sol, 575.97 g of Latex A was added over the course of approximately 30 min using a Cowles blade stirrer at medium speed driven by a Laboratory Disperserator series 2000 Model 90 (Premier Mill, Exton, Pa.). A crumb formed. After adding the latex, the mixture was stirred an additional 30 min followed by 5 min of settling. The solids were rinsed as in Example 1 and dried at 100° C. for 16 hrs to yield 196.1 g of material (98.0% yield).

Example 8 (EX 8)

To 31.75 g of zinc oxide sol, 554.0 g of Latex A was added over the course of approximately 30 min using a Cowles blade stirrer at medium speed driven by a Laboratory Disperserator series 2000 Model 90 (Premier Mill, Exton, Pa.). A crumb formed. After adding the latex, the mixture was stirred an additional 30 min followed by 5 min of settling. The solids were rinsed as in Example 1 and dried at 100° C. for 16 hrs yielding 191.1 g of material (95.0% yield).

Comparative Example 1 (CE 1)

To 622.47 g of Latex C, 31.25 g of zirconia sol #2 was added over the course of 2 min while mixing on medium speed of a Cowles blade driven by a Laboratory Disperserator series 2000 Model 90 (Premier Mill, Exton, Pa.). The mixture did not form any solids during addition or during 15 min of additional mixing or 5 min of settling and remained milky in appearance.

Comparative Example 2 (CE 2)

To 594.18 g of Latex C, 60.6 g of zinc oxide sol was added over the course of 2 min while mixing on a medium speed of a Cowles blade driven by a Laboratory Disperserator series 2000 Model 90 (Premier Mill, Exton, Pa.). The mixture did not form any solids during addition or during 15 min of additional mixing or 5 min of settling and remained milky in appearance.

Comparative Example 3 (CE 3)

To 594.18 g of Latex C, 36.37 g of silica sol #1 was added over the course of 2 min while mixing on a medium speed of a Cowles blade driven by a Laboratory Disperserator series 2000 Model 90 (Premier Mill, Exton, Pa.). The mixture did not form any solids during addition or during 15 min of additional mixing or 5 min of settling and remained milky in appearance.

Comparative Example 4 (CE 4)

To 121.20 g of silica sol #3, 616.30 g of Latex B latex was added over the course of 10 min while mixing with a Cowles blade at medium speed driven by a Laboratory Disperserator series 2000 Model 90 (Premier Mill, Exton, Pa.). No solids formed and the mixture remained milky in appearance.

Comparative Example 5 (CE 5)

To 602.3 g of Latex B, 53.50 g of silica sol #2 was added over the course of approximately 2 min while stirring with a three blade stirrer and a variable speed mixer (IKA) set at 1600 rpm. No solids formed and the mixture remained milky in appearance.

Comparative Example 6 (CE 6)

To 222.20 g of silica sol #4, 548.90 g of Latex B was added over the course of 10 min while stirring with Laboratory Disperserator series 2000, model 90 (Premier Mill, Eaton, Pa.) at medium speed with a Cowles blade. No solids formed and the mixture remained milky in appearance.

Comparative Example 7 (CE 7)

To see the effect of high shear, 551.41 g Latex B was stirred for 20 minutes with a three blade stirrer and a variable speed mixer (IKA) set at 1600 rpm. The stirring was then stopped and a foam layer and clear liquid layer formed. After an additional 5 minutes of sitting, a thin polymeric layer was visible on the surface of the clear liquid and no foam remained. No polymer particles were visible.

Comparative Example 8 (CE 8)

596.28 g of Latex C was stirred with a Laboratory Disperserator series 2000, model 90 at a medium speed (setting of 25 on the VARIAC) for 4 min with a strong vortex reaching the Cowles blade but with no splashing. The stirring was stopped and no polymer particulates were present. The speed was then increased to a point that the liquid was splashing up the sides of the beaker (setting of 35 on the VARIAC). After 4 minutes a large (3 cm diameter) ball had formed in the milky latex. No significant additional polymer particles were present.

Shown in Table 2 is a summary of the experiments, including the calculated p value, which was calculated as described per the specification.

TABLE 2

| Example | Latex | Amount latex added (g) | Nanoparticle | Amount nanoparticle added (g) | Coag. | Yield | P value |
|---|---|---|---|---|---|---|---|
| EX7 | A | 576.97 | Zinc oxide sol | 6.6 | Yes | 98.05% | 27 |
| EX8 | A | 554.0 | Zinc oxide sol | 31.75 | Yes | 95.60% | 230 |
| EX1 | B | 549.69 | Zirconia sol #2 | 141.84 | Yes | 86.20% | −1453 |
| EX6 | B | 288.0 | Zirconia sol #1 | 87.0 | Yes | 95.80% | −291 |
| EX3 | B | 602.30 | Alumina sol | 60.6 | Yes | 50.05% | −965 |
| CE4 | B | 616.3 | Silica sol #3 | 121.2 | No | NA | 982 |
| CE5 | B | 602.3 | Silica sol #2 | 121.2 | No | NA | 1001 |
| CE6 | B | 548.90 | Silica sol #4 | 222.0 | No | NA | 2023 |
| CE7 | B | 551.41 | None | NA | No | NA | NA |
| EX2 | C | 594.18 | Alumina sol | 60.6 | Yes | no data | −971 |
| EX4 | C | 594.2 | Zirconia sol #2 | 62.50 | Yes | 86.42% | −848 |
| CE1 | C | 622.47 | Zirconia sol #2 | 31.25 | No | NA | −441 |
| EX5 | C | 594.18 | Zirconia sol #3 | 129.9 | Yes | 90.60% | −628 |
| CE2 | C | 594.1 | Zinc oxide sol | 60.6 | No | NA | 458 |
| CE3 | C | 594.18 | Silica sol #1 | 36.37 | No | NA | 918 |
| CE8 | C | 596.28 | None | NA | No | NA | NA |

NA: not applicable

As shown in Table 2, mixing of the latex by itself without nanoparticle, as shown in CE7 and CE8, does not cause coagulation of the amorphous fluoropolymer latex. Applicants have found that it is the nanoparticles which cause the coagulation and the mixing of the latex during and following the addition of the nanoparticles is used to improve dispersion of the nanoparticles within the latex. Also shown in Table 2, that the type of latex, the type of nanoparticle, and amount of nanoparticle added impact whether or not the latex will coagulate. Based on a series of experiments, Applicants have discovered a p value of no more than 400 g mV appear to provide sufficient coagulation.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A method of coagulating a fluoropolymer latex comprising:
   providing an amorphous fluoropolymer latex;
   providing unmodified inorganic nanoparticles; and
   contacting the amorphous fluoropolymer latex with a sufficient amount of unmodified inorganic nanoparticles to coagulate the amorphous fluoropolymer latex.

2. The method of claim 1, wherein the method is substantially free of a traditional coagulating agent.

3. The method of any one of claim 1, wherein the amorphous fluoropolymer latex is perfluorinated.

4. The method of claim 1, wherein a mixture comprising the amorphous fluoropolymer latex and the unmodified inorganic nanoparticles have a p value of no more than 400 g mV wherein the p value=$(\zeta_{latex} \cdot X_{latex}/100) - (\zeta_{np} \cdot Y_{np} \cdot X_{np}/100)$ where $\zeta_{latex}$ is the zeta potential of the amorphous fluoropolymer latex, $X_{latex}$ is the % of amorphous fluoropolymer latex solids, $\zeta_{np}$ is the zeta potential of the unmodified inorganic nanoparticles, $X_{np}$ is the percent of unmodified inorganic nanoparticles in the mixture, and $Y_{np}$ is the amount of unmodified inorganic nanoparticles added.

5. The method of claim 1, wherein the amorphous fluoropolymer latex and the umodified inorganic nanoparticles are both acidic.

6. The method of claim 1, wherein
(a) the amorphous fluoropolymer latex is a hexafluoropropylene-vinylidene fluoride copolymer and the unmodified inorganic nanoparticles are alumina; (b) the amorphous fluoropolymer latex is a tetrafluoroethylene-perfluoromethyl vinylether copolymer and the unmodified inorganic nanoparticles are zinc oxide, or (c) the amorphous fluoropolymer latex is a tetrafluoroethylene-perfluoromethyl vinylether copolymer and the unmodified inorganic nanoparticles are zirconia.

7. The method of claim 1, wherein at least 3000 ppm of the unmodified inorganic nanoparticles is added.

8. A fluoropolymer composite made according to the method described in claim 1.

9. The fluoropolymer composite of claim 8, wherein the fluoropolymer composite comprises less than 200 ppm of total metal ions.

10. A cured article derived from the fluoropolymer composite of claim 8.

11. The method of claim 1, wherein the amorphous fluoropolymer latex is partially fluorinated.

12. The method of claim 1, wherein the amorphous fluoropolymer latex is derived from a monomer selected from tetrafluoroethylene, hexafluoropropylene, perfluoromethyl vinyl ether, 3-methoxy perfluoropropylvinyl ether, $CF_2CFOCF_2OCF_2CF_2CF_3$, vinylidene fluoride, chlorotrifluoroethylene, ethylene, propylene, and combinations thereof.

13. The method of claim 1, wherein the amorphous fluoropolymer latex comprises at least one of an iodine-containing cure site group, a bromine-containing cure site group, and a nitrogen-containing cure site group.

14. The method of claim 13, wherein the nitrogen-containing cure site is a nitrile, an amidine, an imidate, an amidoxime, or an amidrazone.

15. The method of claim 1, wherein the unmodified inorganic nanoparticles have an average diameter of less than 100 nm.

16. The method of claim 1, wherein the unmodified inorganic nanoparticles comprise zirconium, alumina, zinc oxide, and combinations thereof.

17. The method of claim 1, wherein the unmodified inorganic nanoparticles comprise silica.

18. The method of claim 1, wherein the fluoropolymer latex further comprises non-fluorinated polymer particles, semi-crystalline polymer particles, crystalline polymer particles, or a combination thereof.

19. The method of claim 18, wherein the fluoropolymer latex comprises less than 25% by weight of non-fluorinated polymer particles, semi-crystalline polymer particles, crystalline and polymer particles versus the total polymer solids in the fluoropolymer latex.

* * * * *

UNITED STATES PATENT AND TRADEMARK OFFICE
CERTIFICATE OF CORRECTION

| | | |
|---|---|---|
| PATENT NO. | : 8,969,469 B2 | Page 1 of 1 |
| APPLICATION NO. | : 13/879820 | |
| DATED | : March 3, 2015 | |
| INVENTOR(S) | : Terri Shefelbine et al. | |

It is certified that error appears in the above-identified patent and that said Letters Patent is hereby corrected as shown below:

On the title page

Item (73) (Assignee), Line 1 – delete "3m" and insert -- 3M --, therefor.

In the specification

Column 3, Line 58 – delete "be may" and insert -- may be --, therefor.

Column 4, Line 1 – delete "phosphoric" and insert -- phosphonic --, therefor.

Column 10, Line 40 – delete "Attelboro," and insert -- Attleboro, --, therefor.

In the claims

Column 14, Line 59 – in Claim 1, after "of" delete "any one of".

Column 15, Line 5 – in Claim 5, delete "umodified" and insert -- unmodified --, therefor.

Signed and Sealed this
Twenty-third Day of February, 2016

Michelle K. Lee
*Director of the United States Patent and Trademark Office*